United States Patent
Li et al.

(10) Patent No.: US 7,869,536 B2
(45) Date of Patent: Jan. 11, 2011

(54) METHOD AND APPARATUS FOR SCALING A SIGNAL FOR IMPROVING PERFORMANCE OF A RECEIVER IN A MIMO SYSTEM

(75) Inventors: Yingxue Li, Exton, PA (US); Robert Lind Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 855 days.

(21) Appl. No.: 11/753,121

(22) Filed: May 24, 2007

(65) Prior Publication Data

US 2007/0280387 A1 Dec. 6, 2007

Related U.S. Application Data

(60) Provisional application No. 60/809,247, filed on May 30, 2006.

(51) Int. Cl.
*H04L 1/02* (2006.01)
(52) U.S. Cl. .................................... 375/267
(58) Field of Classification Search .............. 375/267, 375/299, 347, 349; 700/53; 455/101, 132–141
See application file for complete search history.

(56) References Cited

U.S. PATENT DOCUMENTS

2006/0105767 A1* 5/2006 Kim ........................... 455/434

2006/0232416 A1* 10/2006 Bauch ........................ 340/572.7
2006/0269006 A1* 11/2006 Kuroda ....................... 375/260
2007/0036246 A1* 2/2007 Hammerschmidt .......... 375/340

OTHER PUBLICATIONS

Cendrillon, R., et al., "Simplified Power Allocation and TX/RX Structure for MIMO-DSL," Globecom 2003, IEEE Global Telecommunications Conference, Conference Proceedings, San Francisco, Dec. 1-5, IEEE Global Telecommunications Conference, New York, NY, vol. 7 of 7, p. 1844, left-hand column.

(Continued)

*Primary Examiner*—Sam K Ahn
(74) *Attorney, Agent, or Firm*—Volpe and Koenig, PC

(57) ABSTRACT

A multiple-input multiple-output (MIMO) receiver includes a MIMO decoder, a pre-scaling unit, a demapper, and a post-scaling unit. The MIMO decoder performs a MIMO decoding on received signals to decouple a plurality of symbols transmitted via a plurality of data streams. Both pre-demapping scaling and post-demapping scaling are performed to improve the performance of the receiver. A pre-scaling coefficient is applied to the symbols by the pre-scaling unit to generate pre-scaled symbols. The pre-scaled symbols are converted to soft bits by the demapper. The post-scaling unit then applies a post-scaling coefficient to the soft bits. The post-scaling coefficient is a signal-to-interference and noise ratio (SINR). Cross interference is taken into account in post-demapping scaling to obtain more accurate soft bits for subsequent decoding. The present invention is applicable to both a multi-carrier system, (such as orthogonal frequency division multiplexing (OFDM)), and a single carrier system.

18 Claims, 4 Drawing Sheets

OTHER PUBLICATIONS

Collings, I.B., et al., "Low Complexity Receiver Design for MIMO Bit-Interleaved Coded Modulation," Spread Spectrum Techniques and Applications, 2004 IEEE Eighth International Symposium, Sydney, Australia, Aug. 30-Sep. 2, 2004, Piscataway, NJ Aug. 30, 2004, pp. 12-16.

Doan, L.H., et al., "Hierarchical Subgroup Power and Modulation Code Adaptation—A New Frequency-Space Link Adaptation Scheme in MIMO_OFDM Eigenmode Adaptive Transmission System," IEEE 61st Vehicular Technology Conference, 2005, Stockholm, Sweden, Apr. 30-May 1, 2005, Piscataway, NJ, May 30, 2005, pp. 668-672.

Jiang, Y., et al., "Uniform Channel Decomposition for MIMO Communications," Conference Record of the Thirty-Eighth Asilomar Conference on Signals Systems and Computers, Pacific Grove, CA, Nov. 7-10, 2004, Piscataway, NJ, IEEE, Nov. 7, 2004, pp. 856-860.

Ng, S.X., et al., "Full-Rate, Full-Diversity Adaptive Space Time Block Coding for Transmission over Rayleigh Fading Channels," IEEE 61st Vehicular Technology Conference, 2005, Stockholm, Sweden, Apr. 30-May 1, 2005, Piscataway, NJ, May 30, 2005, pp. 1210-1214.

Song, Kee-Bong, et al., "A Low Complexity Space-Frequency BICM MIMO-OFDM System for Next-Generation WLANs," Globecom 2003, IEEE Global Telecommunications Conference, Conference Proceedings, San Francisco, Dec. 1-5, IEEE Global Telecommunications Conference, New York, NY, vol. 7 of 7, pp. 1059-1063.

* cited by examiner

METHOD AND APPARATUS FOR SCALING A SIGNAL FOR IMPROVING PERFORMANCE OF A RECEIVER IN A MIMO SYSTEM

CROSS REFERENCE TO RELATED APPLICATION

This application claims the benefit of U.S. Provisional Application No. 60/809,247 filed May 30, 2006, which is incorporated by reference as if fully set forth.

FIELD OF INVENTION

The present invention is related to wireless communication systems. More particularly, the present invention is related to a method and apparatus for scaling a signal for improving performance of a receiver in a multiple-input multiple-output (MIMO) system.

BACKGROUND

To improve spectral efficiency, a MIMO technique has been widely adopted by various wireless communication standards, such as IEEE 802.16, 802.11n and evolved universal terrestrial radio access (E-UTRA). In MIMO systems, multiple data streams are transmitted over multiple antennas in the same frequency-time block. However, an optimum MIMO receiver based on a maximum likelihood (ML) algorithm is extremely complex. Therefore, near optimum MIMO receivers having lower complexity, (such as sphere decoding and a QR decomposition based maximum likelihood detector (QRD-MLD)), have been developed. However, the complexity of these near optimum receivers is still high, especially for hand held devices.

More practical MIMO receivers employ low complexity linear receivers, (such as a zero-forcing (ZF) or minimum mean squared error (MMSE) receiver), at the cost of reduced performance. With channel state information known to the receiver, a ZF receiver may completely decouple multiple data streams without causing any cross interference. However, the ZF receiver amplifies ambient noise and, therefore, the overall performance is degraded. An MMSE receiver, on the other hand, takes both cross interference and noise into account, resulting in better performance. However, the MMSE receiver itself would result in biased estimation of a signal, and therefore, causes performance degradation, especially for higher order modulation, (such as 16 quadrature amplitude modulation (16 QAM), 64 QAM, or the like), where data is both phase and amplitude modulated.

FIG. 1 shows a conventional MMSE-based MIMO receiver 100 for a single carrier system. The receiver 100 comprises a plurality of antennas 102a-102n, a plurality of radio frequency (RF) units 104a-104n, an MMSE MIMO decoder 106, a plurality of demappers 108a-108n, and a plurality of scaling units 110a-110n. Signals 103a-103n are received by the antennas 102a-102n. Each signal 103a-103n is down-converted and digitized by the corresponding RF unit 104a-104n. The digitized signals 105a-105n are fed to the MMSE MIMO decoder 106 where multiple data streams 107a-107n are decoupled. Each decoupled data stream 107a-107n is fed to the corresponding demappers 108a-108n, where symbol representation of data is converted into soft bits 109a-109n. The MMSE MIMO decoder 106 also calculates an effective signal-to-noise ratio (SNR) 111a-111n on the MMSE output of the MMSE MIMO decoder 106 and sends the effective SNR 111a-111n to the respective scaling units 110a-110n. The soft bits 109a-109n are weighted by the corresponding scaling units 110a-110n according to the effective SNR 111a-111n. The weighted soft bits 113a-113n are then sent to decoders (not shown) for decoding.

A received signal may be expressed as follows:

$$Y = \sqrt{E_s} HX + N; \qquad \text{Equation (1)}$$

where X is a column vector with m elements, ($x_m$ being data transmitted from the m-th antenna), Y is a column vector with n elements, ($y_n$ being data received by the n-th antenna), H is a channel matrix with its element $h_{nm}$ representing channel coefficients between the m-th transmit antenna and the n-th receive antenna, N is a noise term with variance $\sigma^2$, and $E_S$ is transmit power per symbol.

FIG. 2 is a detailed block diagram of the MMSE MIMO decoder 106 of FIG. 1. The MMSE MIMO decoder 106 includes an R matrix calculation unit 204, an SNR calculation unit 206, and a filtering unit 208. The R matrix calculation unit 204 receives signal power and noise power values 201 and a channel matrix H 202 and calculates a matrix R 205 as follows:

$$R = \left(H^H H + \frac{I}{SNR}\right)^{-1} H^H; \qquad \text{Equation (2)}$$

where superscript H stands for matrix conjugate transpose. The signal power and noise power values 201 and the channel matrix 202 are generated based on the digitized signals 105a-105n, and specific blocks for generating the signal power and noise power values 201 and the channel matrix 202 are not shown in FIG. 2 for simplicity.

The filtering unit 208 of the MMSE MIMO decoder 106 receives a matrix Y 203 corresponding to the digitized signals 105a-105n and the matrix R 205 and performs symbol estimation as follows:

$$\hat{X} = \left(H^H H + \frac{I}{SNR}\right)^{-1} H^H Y = RY; \qquad \text{Equation (3)}$$

where $$SNR = \frac{E_s}{\sigma^2}.$$

The estimated symbols 107a-107n are then sent to the corresponding demappers 108a-108n of FIG. 1.

The SNR calculation unit 206 calculates an effective post-MMSE SNR 111a-111n and outputs them to the corresponding scaling units 110a-110n of FIG. 1 for post-demapping scaling. The effective post-MMSE SNR for the n-th data stream is calculated as follows:

$$\rho_n = SNR/(RR^H)_{nn}; \qquad \text{Equation (4)}$$

where the subscript nn stands for n-th diagonal element of a matrix. The scaling units 110a-110n of FIG. 1 then multiplies the soft bits 109a-109n with a corresponding post-MMSE SNR obtained by Equation (3).

SUMMARY

The present invention is related to a method and apparatus for scaling a signal for improving performance of a receiver in a MIMO system. A MIMO receiver includes an MMSE MIMO decoder, a pre-scaling unit, a demapper, and a post-scaling unit. The MMSE MIMO decoder performs MIMO decoding on received signals to decouple a plurality of symbols transmitted via a plurality of data streams. Both pre-demapping scaling and post-demapping scaling are performed to improve the performance of the receiver. A pre-scaling coefficient is applied to the symbols by the pre-scaling unit to generate pre-scaled symbols. Each of the pre-scaled symbols are converted to soft bits by the demapper. The post-scaling unit then applies a post-scaling coefficient to the soft bits. The post-scaling coefficient is a signal-to-interference and noise ratio (SINR). Cross interference is taken into account in post-demapping scaling to obtain more accurate soft bits for subsequent decoding. The present invention is applicable to both a multi-carrier system, (such as orthogonal frequency division multiplexing (OFDM)), and a single carrier system.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "receiver" includes but is not limited to a wireless transmit/receive unit (WTRU), a user equipment (UE), a mobile station, a fixed or mobile subscriber unit, a pager, a cellular telephone, a personal digital assistant (PDA), a computer, or any other type of user device capable of operating in a wireless environment. The terminology "receiver" may also include but is not limited to a base station, a Node-B, a site controller, an access point (AP), or any other type of interfacing device capable of operating in a wireless environment.

In accordance with the present invention, both pre-demapping scaling and post-demapping scaling are performed to improve the performance of the receiver. The pre-demapping scaling aligns the post-MMSE signal with reference modulation constellation, while the post-demapping scaling adjusts soft bits, (i.e., log likelihood ratio (LLR)), according to the corresponding SINR. In accordance with the present invention, an unbiased signal estimation is performed first, which is essential for demapping high order modulation symbols, while avoid amplifying ambient noise. Cross interference is then taken into account in post demapping scaling to obtain more accurate soft bits for subsequent decoding.

Figure 3:
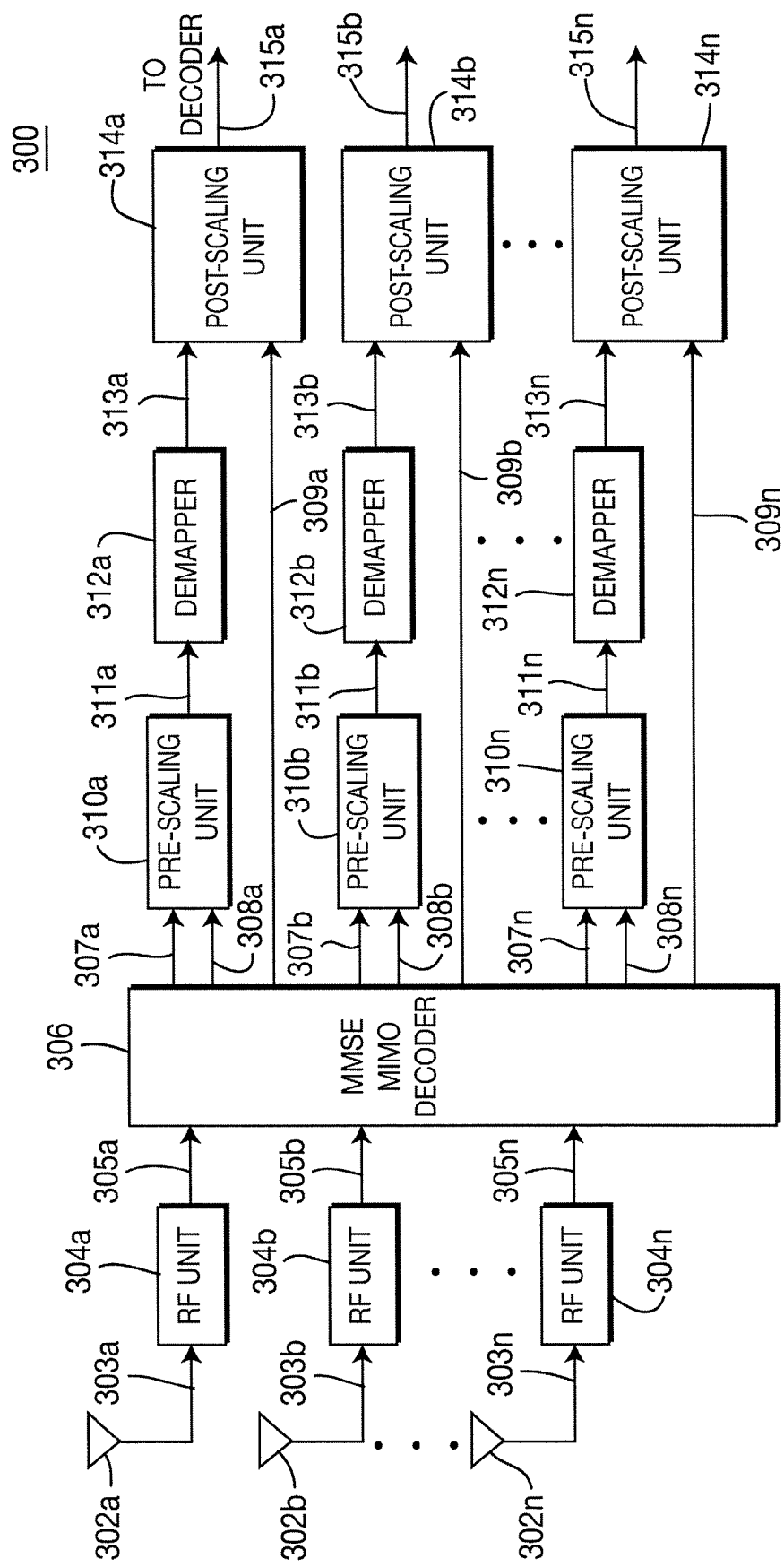
FIG. 3 shows an MMSE receiver for a single carrier MIMO system in accordance with the present invention.

FIG. 3 shows an MMSE receiver 300 for a single carrier MIMO system in accordance with the present invention. The receiver 300 includes a plurality of antennas 302a-302n, a plurality of RF units 304a-304n, an MMSE MIMO decoder 306, a plurality of pre-scaling units 310a-310n, a plurality of demappers 312a-312n, and a plurality of post-scaling units 314a-314n. Signals 303a-303n are received by the antennas 302a-302n. Each received signal 303a-303n is down-converted and digitized by the corresponding RF units 304a-304n. The digitized signals 305a-305n are fed to the MMSE MIMO decoder 306 where symbols 307a-307n transmitted via multiple data streams are decoupled.

The MMSE MIMO decoder 306 performs symbol estimation according to Equation (2) and outputs symbols 307a-307n to the pre-scaling units 310a-310n. The MIMO decoder 306 also calculates pre-scaling coefficients 308a-308n for the symbols 307a-307n and outputs the pre-scaling coefficients 308a-308n to the corresponding pre-scaling units 310a-310n. Each of the pre-scaling units 310a-310n applies the pre-scaling coefficient 308a-308n to the corresponding symbols 307a-307n to generate pre-scaled symbols 311a-311n. The pre-scaled symbols 311a-311n are then fed to the demappers 312a-312n, which convert the pre-scaled symbols 311a-311n into soft bits 313a-313n.

The MMSE MIMO decoder 306 also calculates post-scaling coefficients 309a-309n by taking into account cross data stream interference. The post-scaling coefficients 309a-309n are essentially an SINR, as opposed to an SNR in the conventional method. Each of the post-scaling units 314a-314n applies the corresponding post-scaling coefficients 309a-309n to the corresponding soft bits 313a-313n. The weighted soft bits 315a-315n are then sent to decoders (not shown) for decoding.

Figure 1:
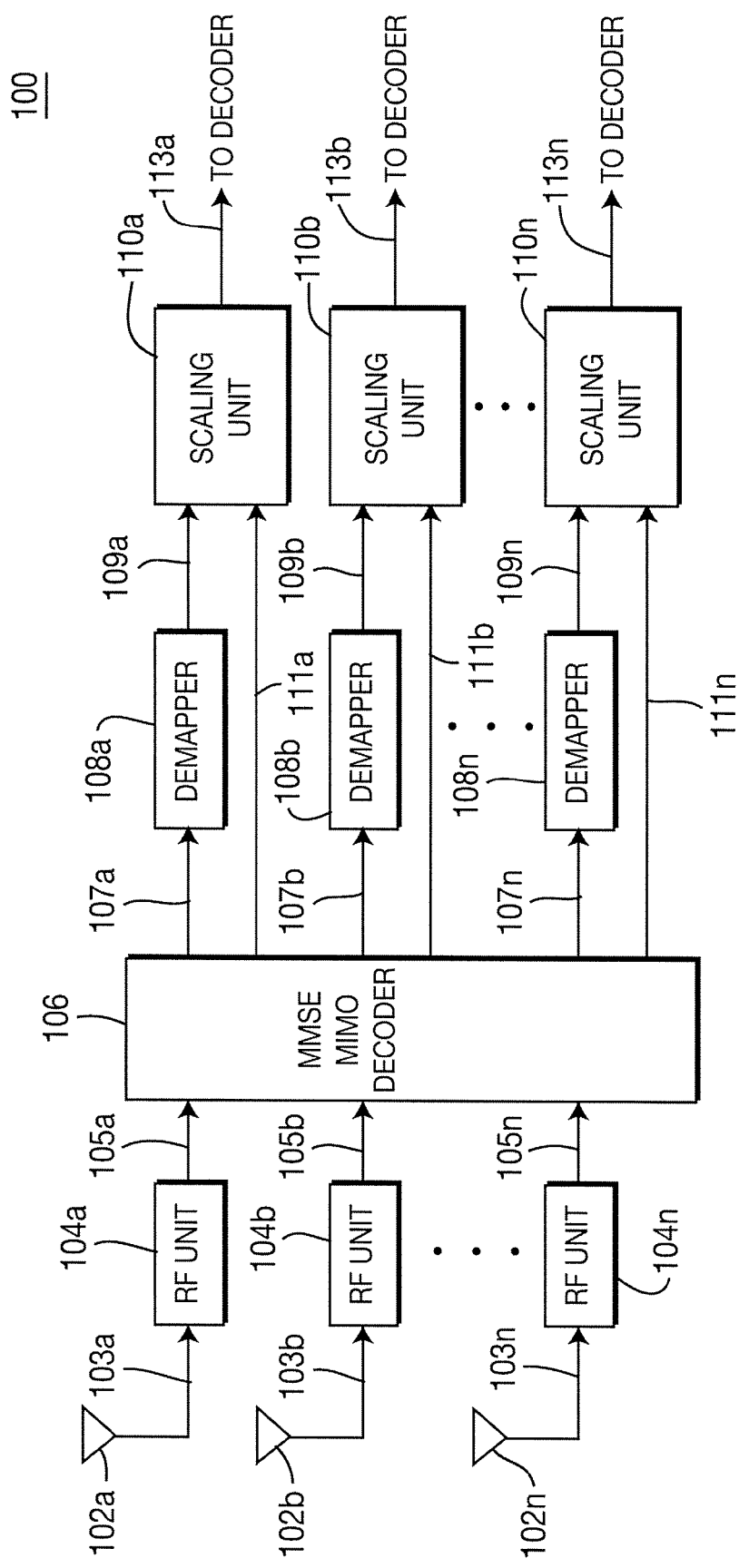
FIG. 1 shows a conventional MMSE-based MIMO receiver for a single carrier system.
Figure 2:
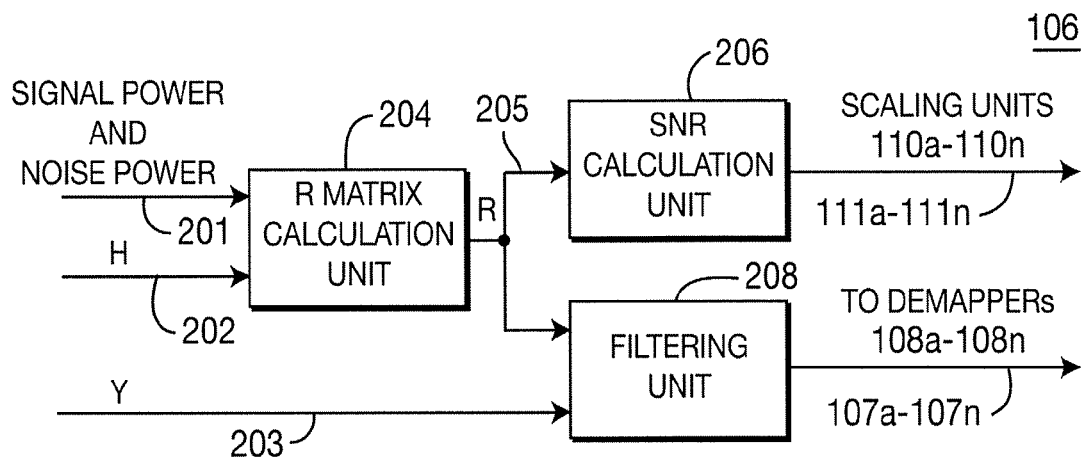
FIG. 2 is a detailed block diagram of the MMSE MIMO decoder of FIG. 1.
Figure 4:
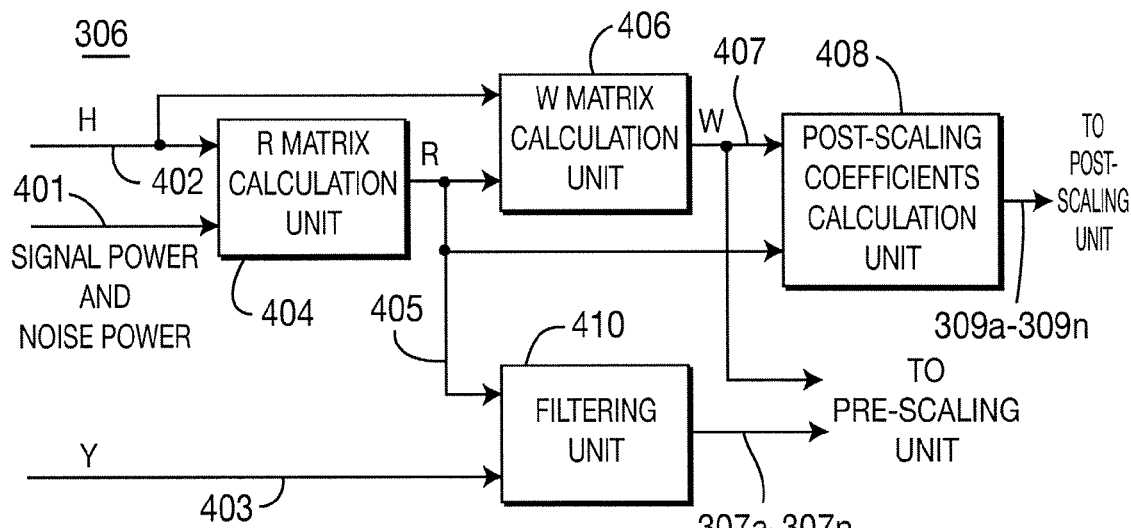
FIG. 4 is an exemplary block diagram of the MMSE MIMO decoder of FIG. 3.

FIG. 4 is an exemplary block diagram of the MMSE MIMO decoder 306 of FIG. 3. The MMSE MIMO decoder 306 includes an R matrix calculation unit 404, a W matrix calculation unit 406, a post-scaling coefficients calculation unit 408, and a filtering unit 410. The R matrix calculation unit 404 of the MMSE MIMO decoder 306 receives signal power and noise power values 401 and a channel matrix H 402 and calculates a matrix R 405 according to Equation (2). The signal power and noise power values 401 and the channel matrix 402 are generated based on the digitized signals 305a-305n of FIG. 3, and specific blocks for generating the signal power and noise power 401 and the channel matrix 402 are not shown in FIG. 4 for simplicity. The W matrix calculation unit 406 of the MMSE MIMO decoder 306 receives the R matrix 405 and the H matrix 402 and calculates a W matrix 407, W=RH. The W matrix calculation unit 406 outputs the W matrix 407 to the post-scaling coefficients calculation unit 408 and to the pre-scaling units 310a-310n of FIG. 3.

The filtering unit 410 receives a matrix Y 403 corresponding to the digitized signals 305a-305n and the matrix R 405 and performs symbol estimation according to Equation (3). The estimated symbols 307a-307n are then sent to the corresponding pre-scaling units 310a-310n of FIG. 3. The pre-scaling units 310a-310n scale the estimated symbols 307a-307n, (i.e., the post-MMSE symbol estimation $\hat{X}$), by dividing the n-th element of $\hat{X}$ by the n-th diagonal element of the matrix W 407.

The post-scaling coefficients calculation unit 408 calculates post-scaling coefficients 309a-309n and outputs them to the corresponding post-scaling units 314a-314n of FIG. 3. The post-scaling coefficients 309a-309n are calculated by taking into account the cross data stream interference. After MIMO decoding, the effective signal power for the n-th data stream becomes $w_{nn}^2 E_S$, the noise power becomes $(R R^H)_{nn} \sigma^2$, and the interference to the n-th data stream becomes $((W^H W)_{nn} - w_{nn}^2) E_S$. The SINR, (i.e., the post-scaling coefficients), for the n-th data stream is as follows:

$$\frac{w_{nn}^2 E_s}{(RR^H)_{nn}\sigma^2 + ((W^H W)_{nn} - w_{nn}^2)E_s}. \quad \text{Equation (5)}$$

The post-scaling units 314a-314n of FIG. 3 multiplies the soft bits with the corresponding SINR.

It should be noted that FIGS. 3 and 4 are provided as an example, not as a limitation, and some of the functional blocks shown in FIGS. 3 and 4 may be combined or separated, and the order of operation may be changed. For example, the pre-scaling unit 310a-310n may be combined with the MMSE MIMO decoder 306.

Figure 5:
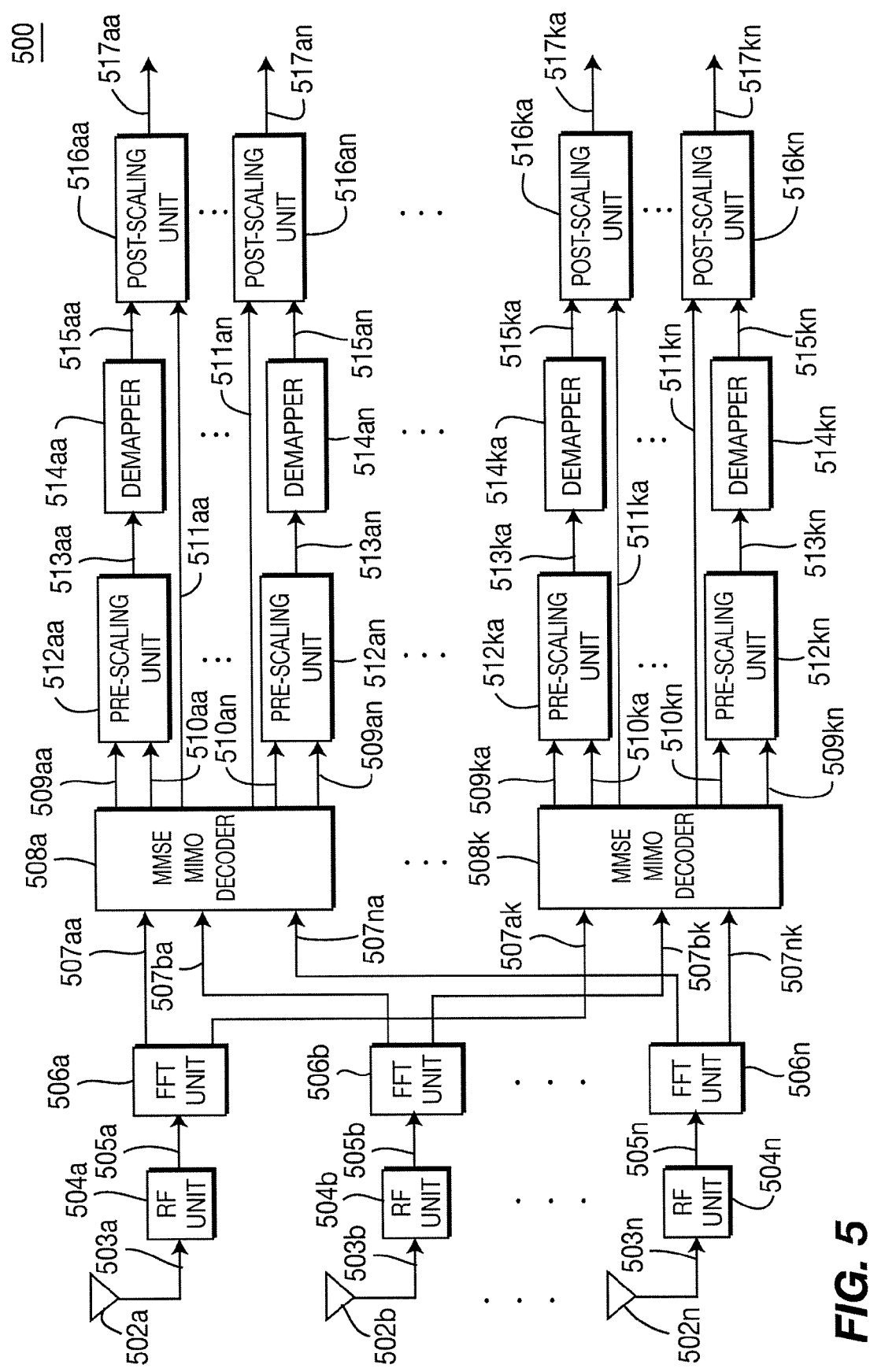
FIG. 5 shows an OFDM MIMO receiver in accordance with the present invention.

The present invention is also applicable to an OFDM MIMO system. FIG. 5 shows an OFDM MIMO receiver 500 in accordance with the present invention. The receiver 500 includes a plurality of antennas 502a-502n, a plurality of RF units 504a-504n, a plurality of fast Fourier transform (FFT) units 506a-506n, a plurality of MIMO decoders 508a-508k, a plurality of pre-scaling units 512aa-512kn, a plurality of demappers 514aa-514kn, and a plurality of post-scaling units 516aa-516kn. Signals 503a-503n are received by the antennas 502a-502n. Each received signal 503a-503n is down-converted and digitized by the corresponding RF units 504a-504n. The digitized signals 505a-505n are converted to frequency domain data 507aa-507kn by the FFT units 506a-506n. Each FFT unit 506a-506n outputs k subcarrier signals.

After FFT, the signals on the same subcarrier from the plurality of FFT units 506a-506n are fed to the corresponding MMSE MIMO decoders 508a-508k. Each of the MMSE MIMO decoders 508a-508k performs symbol estimation according to Equation (2). The MMSE MIMO decoders 508a-508k output symbols 509aa-509kn to the pre-scaling units 512aa-512kn. The MMSE MIMO decoders 508a-508k also calculate pre-scaling coefficients 510aa-510kn for the symbols 509aa-509kn and outputs the pre-scaling coefficients 510aa-510kn to the corresponding pre-scaling units 512aa-512kn. Each of the pre-scaling units 512aa-512kn applies the corresponding pre-scaling coefficient 510aa-510kn to the corresponding symbol 509aa-509kn to generate pre-scaled symbols 513aa-513kn. The pre-scaled symbols 513aa-513kn are then fed to the demappers 514aa-514kn, which convert the pre-scaled symbols 513aa-513kn into soft bits 515aa-515kn.

The MMSE MIMO decoders 508a-508k also calculate post-scaling coefficients 511aa-511kn, (i.e., SINR), according to Equation (5). The post-scaling units 516aa-516kn apply the post-scaling coefficients 511aa-511kn to the soft bits 515aa-515kn. The weighted soft bits 517aa-517kn are then sent to decoders (not shown) for decoding.

Figure 6:
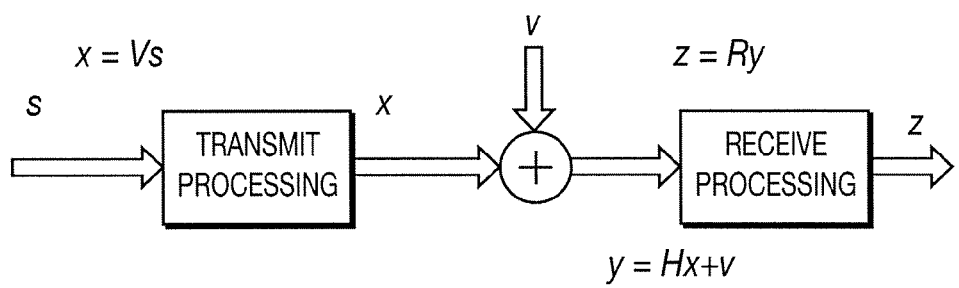
FIG. 6 shows a channel model for eigen beamforming.

In accordance with another embodiment, eigen beamfoming based on singular value decomposition (SVD), eigenvalue decomposition (EVD) or similar methods is implemented for transmitting data between a transmitter and a receiver. FIG. 6 shows a channel model for eigen beamforming. SVD of the channel matrix H is written as follows:

$$SVD(H)=UDV^H; \quad \text{Equation (6)}$$

where V is an $M_T \times M_T$ unitary matrix, U is a unitary matrix including eigenvectors of $HH^H$, and V is a unitary matrix including eigenvectors of $H^H H$. The matrix D is a diagonal matrix whose diagonal elements are singular values of H, denoted as $\{\lambda_1, \lambda_2, \ldots, \lambda_N\}$.

At the transmitter, a precoding matrix V is multiplied to the transmit symbol vector s for transmit precoding as follows:

$$X=Vs. \quad \text{Equation (7)}$$

A received signal at the receiver becomes as follows:

$$Y=HVs+N. \quad \text{Equation (8)}$$

An MMSE receiver of an eigen-beamformed system may be defined by the receive processing matrix R as follows:

$$R = \left[\hat{H}^H \hat{H} + \frac{I}{SNR}\right]^{-1} \hat{H}^H; \quad \text{Equation (9)}$$

where $\hat{H}=HV$ is an effective channel matrix.

Using the receive processing matrix R, the reference matrix W, (W=R$\hat{H}$), is calculated as in a non-beamforming case. Pre-scaling is then performed by dividing the n-th element of the post-MMSE signal estimation ŝ by the n-th diagonal element of W.

The noise power for the n-th data stream after MMSE decoding becomes $(RR^H)_{nn}\sigma^2$. Similarly, the cross data stream interference and effective SINR are calculated according to Equation (5) as in the non-beamforming case. The effective SINR is then multiplied to the soft bits.

Alternatively, the MIMO decoder for the eigen-beamfomed MIMO system may be implemented with a matched filter. The MIMO decoder, (i.e., the matched filter), performs the following operation in order to estimate the transmit symbols s:

$$\hat{S}=D^H U^H Y=D^H U^H(HVS+N)=D^H U^H(UDV^H VS+N)=D^H DS+D^H U^H N \quad \text{Equation (10)}$$

Hence s is detected without having to perform successive interference cancellation of MMSE type detector. $D^H D$ is a diagonal matrix that is formed by eigenvalues of H. The pre-scaling coefficients for the n-th data stream is calculated as $(D^H D)_{nn}=\lambda_n^2$. The symbols estimated in accordance with Equation (10) are divided by the corresponding pre-scaling coefficients.

An SNR for the n-th data stream becomes as follows:

$$SNR(s_n) = \frac{(d_n^2)^2 E_s}{d_n^2 \sigma^2} = \frac{d_n^2 E_s}{\sigma^2}, \quad \text{Equation (11)}$$

which is to be used as post-scaling coefficients. The soft bits of each data stream after de-mapping are multiplied by the corresponding SNR.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of scaling a signal for decoding in a multiple-input multiple-output (MIMO) wireless communication system, the method comprising:
   receiving signals via multiple antennas;
   performing MIMO decoding on the signals to generate a plurality of symbols transmitted via a plurality of data streams;
   computing a pre-scaling coefficient and a post-scaling coefficient for each of the symbols;
   applying the pre-scaling coefficient to a corresponding symbol to generate pre-scaled symbol;
   de-mapping the pre-scaled symbol to soft bits; and
   applying the post-scaling coefficient to corresponding soft bits.

2. The method of claim 1 wherein the post-scaling coefficient is a signal-to-interference and noise ratio (SINR).

3. The method of claim 1 wherein the symbols are obtained based on minimum mean square error (MMSE) criteria.

4. The method of claim 3 wherein the pre-scaling coefficient is a diagonal element of a matrix W, W=RH, R being a receive processing matrix $$R = \left(H^H H + \frac{I}{SNR}\right)^{-1} H^H$$

and H being a channel matrix, wherein SNR is Signal to Noise Ratio and I is an identity matrix.

5. The method of claim 4 wherein the post-scaling coefficient is $$\frac{w_{nn}^2 E_s}{(RR^H)_{nn}\sigma^2 + ((W^H W)_{nn} - w_{nn}^2)E_s},$$

wherein $w_{nn}^2$ is an square of an n-th element of the matrix W and $E_s$ is a power of transmitted signals, $\sigma^2$ is variance, and nn stands for n-th diagonal element.

6. The method of claim 1 wherein the MIMO wireless communication system is a single carrier MIMO system.

7. The method of claim 1 wherein the MIMO wireless communication system is an orthogonal frequency division multiplexing (OFDM) MIMO system.

8. The method of claim 1 wherein eigen beamfoming is performed at a transmitter for transmitting the signals.

9. The method of claim 8 wherein the MIMO decoding is performed by a matched filter.

10. A multiple-input multiple-output (MIMO) receiver configured to scale received signals for decoding in a MIMO wireless communication system, the MIMO receiver comprising:
    a plurality of antennas for receiving signals;
    a MIMO decoder for performing MIMO decoding on the signals to decouple a plurality of symbols transmitted via a plurality of data streams;
    a pre-scaling unit for applying a pre-scaling coefficient to a corresponding symbol to generate a pre-scaled symbol;
    a demapper for demapping the pre-scaled symbol to soft bits; and
    a post-scaling unit for applying a post-scaling coefficient to the soft bits.

11. The MIMO receiver of claim 10 wherein the post-scaling coefficient is a signal-to-interference and noise ratio (SINR).

12. The MIMO receiver of claim 10 wherein the symbols are obtained based on minimum mean square error (MMSE) criteria.

13. The MIMO receiver of claim 12 wherein the pre-scaling coefficient is a diagonal element of a matrix W, W=RH, R being a receive processing matrix $$R = \left(H^H H + \frac{I}{SNR}\right)^{-1} H^H$$

and H being a channel matrix, wherein SNR is signal to noise ratio and I is an identity matrix.

14. The MIMO receiver of claim 13 wherein the post-scaling Coefficient is $$\frac{w_{nn}^2 E_s}{(RR^H)_{nn}\sigma^2 + ((W^H W)_{nn} - w_{nn}^2)E_s},$$

wherein $w_{nn}^2$, is a square of an n-th element of the matrix W and $E_s$ is a power of transmitted signals, $\sigma^2$ is variance, and nn stands for n-th diagonal element.

15. The MIMO receiver of claim 10 wherein the MIMO receiver is a single carrier MIMO receiver.

16. The MIMO receiver of claim 10 wherein the MIMO receiver is an orthogonal frequency division multiplexing (OFDM) MIMO receiver.

17. The MIMO receiver of claim 10 wherein eigen beamfoming is performed at a transmitter for transmitting the signals.

18. The MIMO receiver of claim 17 wherein the MIMO decoder is a matched filter.

* * * * *